United States Patent [19]

Fettis et al.

[11] Patent Number: 5,151,392
[45] Date of Patent: Sep. 29, 1992

[54] MOVING BED REGENERATION PROCESS WITH SEPARATE DISPERSION AND CHLORIDING STEPS

[75] Inventors: Michael E. Fettis, Prospect Heights; Paul R. Cottrell, Arlington Heights, both of Ill.

[73] Assignee: UOP, Des Plaines, Ill.

[21] Appl. No.: 662,302

[22] Filed: Feb. 28, 1991

Related U.S. Application Data

[63] Continuation-in-part of Ser. No. 448,465, Dec. 11, 1989, abandoned.

[51] Int. Cl.$^5$ .................. B01J 38/44; B01J 23/96; B01J 8/12; C10G 35/12
[52] U.S. Cl. .................. 502/37; 208/140; 422/220; 422/223; 502/35
[58] Field of Search .............. 502/35, 37; 208/140

[56] References Cited

U.S. PATENT DOCUMENTS

| | | | |
|---|---|---|---|
| 2,908,636 | 10/1959 | Steffgen et al. | 208/140 |
| 2,965,563 | 12/1960 | Steffgen et al. | 502/35 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,986,982 | 10/1976 | Crowson et al. | 502/37 |

*Primary Examiner*—Paul E. Konopka
*Attorney, Agent, or Firm*—Thomas K. McBride; John G. Tolomei

[57] ABSTRACT

A process for reforming hydrocarbons has a regeneration process for reconditioning catalyst particles containing platinum that improves the process by transferring the catalyst particles through a combustion zone, a drying zone, a redispersion zone and a chloride uptake zone. Drying of the catalyst particles immediately after the combustion of coke improves the operation of a platinum redispersion zone and a chloride uptake zone. Separate platinum redispersion zones and chloride uptake zones are provided so that the dried catalyst that enters the platinum redispersion zone can be contacted with a high concentration of chlorine with a lower overall concentration of chloride compounds in the redispersion zone. The lower moisture content allows the equilibrium reaction between hydrogen chloride and oxygen on the one hand, and water and chlorine on the other hand to be shifted to the production of chlorine. This shift of the equilibrium reaction can be further improved by maintaining an oxygen-enriched environment within the platinum redispersion zone. Conversely, the chloride uptake zone would have essentially all the chloride contained therein in the form of hydrogen chloride. Only a relatively low concentration of hydrogen chloride is needed and the chloride uptake zone can be designed such that virtually all of the chloride compounds entering the zone are taken up with the catalyst. The uptake of virtually all the hydrogen chloride in the chloride uptake zone and the use of a much lower chloride concentration in the redispersion zone reduces the emissions of hydrogen chloride from the regeneration zone. Aside from improving the platinum redispersion, the overall reduction of chlorides in the platinum redispersion zone allows the elimination of a costly halogen circulation loop that was previously needed in a halogenation zone to maintain a sufficient chlorine concentration for redispersion of the platinum.

14 Claims, 2 Drawing Sheets

MOVING BED REGENERATION PROCESS WITH SEPARATE DISPERSION AND CHLORIDING STEPS

CROSS REFERENCE TO RELATED APPLICATIONS

This application if a continuation in part of copending application U.S. Ser. No. 448,465, filed Dec. 11, 1989, now abandoned.

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke containing catalyst at high temperature with an oxygen-containing gas to combust and remove the coke in a regeneration process. These processes can be carried out in-situ or the catalyst may be removed from a vessel in which the hydrocarbon conversion takes place and transported to a separate regeneration zone for coke removal. Arrangements for continuously or semicontinuously removing catalyst particles from a reaction zone and for coke removal in a regeneration zone are well known.

In order to combust coke in a typical regeneration zone, a recycle gas is continuously circulated to the combustion section and a flue gas containing by-products of a coke combustion, oxygen, and water is continually withdrawn. Coke combustion is controlled by recycling a low oxygen concentration gas into contact with the coke-containing catalyst particles. The flue gas/recycle gas is continuously circulated through the catalyst particles. A small stream of makeup gas is added to the recycle gas to replace oxygen consumed in the combustion of coke and a small amount of flue gas is vented off to allow for the addition of the makeup gas. The steady addition of makeup gas and the venting of flue gas establishes a steady state condition that produces a nearly constant concentration of water and oxygen as well as the combustion products in the recycle gas.

In continuous or semi-continuous regeneration process, coke laden particles are at least periodically added and withdrawn from a bed of catalyst in which the coke is combusted. Regions of intense burning that extend through portions of the catalyst bed develop as the coke is combusted. After this intense burning the catalyst requires reconditioning to restore the noble metal, usually platinum, to its most highly catalytic state and to replace chloride on the catalyst that may be lost in the reaction zone or through the regeneration process. Reconditioning for a reforming catalyst will include contact with a chloride containing compound, to redistribute the platinum metal and replace the chloride that may be lost from the catalyst, followed by a drying step to reduce the moisture content of the catalyst and finally a reducing step to change the platinum metal from various oxidized states to a reduced metallic condition.

A number of environmental and operational problems have been associated with these catalyst reconditioning steps. Replacing chloride on the catalyst and re-dispersing platinum over the surface of the catalyst are both done in the presence of a chloride compound. However, the catalyst platinum redispersion benefits from a high chlorine environment whereas chloriding is usually effected more efficiently in the presence of hydrogen chloride. The chlorine and hydrogen chloride in the chloride contact zone are in equilibrium with the water and oxygen present therein. This equilibrium is skewed towards higher concentrations of hydrogen chloride. In order to provide adequate chlorine for redispersion of the platinum metal the total concentration of hydrogen chloride must be relatively high. Maintaining the high hydrogen chloride environment adds to the expense of designing the regeneration zone by requiring the recycle of hydrogen chloride-containing gas. In most cases, this recycle of the gas is done by a closed loop system, a heater, a blower and associated piping. The expense of this equipment is compounded by the fact that exotic materials are needed to withstand a hydrogen chloride environment. Moreover, gas must be vented from the halogenation loop that circulates the hydrogen chloride containing gas. This vented gas has a high concentration of hydrogen chloride and must, therefore, be vented or treated in a way that avoids damage to equipment or the environment. Another drawback associated with the high hydrogen chloride environment is that there is often more hydrogen chloride uptake on the catalyst than is necessary or desired.

This invention provides a method of reactivating a noble metal catalyst that has been deactivated by the accumulation of coke on its surface and requires regeneration to remove coke and needs redispersion of the noble metal to provide adequate catalytic activity. This invention is particularly suited for catalysts that use platinum metals and maintain a chloride concentration on the catalyst particles. In such cases, the arrangement and operation of this method and apparatus will improve the redispersion of platinum on the catalyst particles and allow a better control of the chloride content on the reconditioned particles. This invention can also reduce emissions and handling problems associated with hydrogen chloride containing gases and can reduce the overall expense of operating a regeneration zone for the reconditioning of such catalyst particles.

INFORMATION DISCLOSURE

U.S. Pat. No. 3,652,231 (Greenwood et al.) shows regeneration apparatus in which a constant-width movable bed of catalyst is utilized. The '231 patent also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. The teachings of patents ('231, '680, and '496) are hereby incorporated in full into this patent application.

U.S. Pat. Nos. 2,908,636 and 2,965,563 issued to Steffgen et. al. disclose basic steps for the regeneration of reforming catalyst.

U.S. Pat. No. 3,986,982 issued to Crowson et. al. teaches the completion of reforming catalyst regeneration with a final reduction step.

SUMMARY OF THE INVENTION

This invention is a process for catalytically reforming hydrocarbons that regenerates the hydrocarbon conversion catalyst particles in a regeneration zone that uses at least two separate and distinct steps for contacting the catalyst undergoing regeneration with chlorine containing compounds. In the regeneration zone the entire regeneration operation is performed in the following order by passing the catalyst through a combustion zone, a drying zone, a metal redispersion zone, and a chloride uptake zone. This operation removes coke and reconditions catalyst particles. The regeneration process and arrangement begins with a combustion zone which is followed by a drying zone to remove moisture from the catalyst particles before they enter the metal redispersion zone. By removing moisture upstream of the metal redispersion zone, a high chlorine concentration can be maintained in the metal redispersion zone without a high HCl concentration. The high chlorine content in the redispersion zone favors the redispersion of noble metals particularly platinum. By providing a separate chloride uptake zone only a small addition of hydrogen chloride is needed to maintain enough chloride therein to supply the necessary chloride uptake on the catalyst. Thus, by arranging the different catalyst reconditioning zones, in the aforementioned order, metal redispersion on the catalyst is improved while at the same time chlorine and hydrogen chloride addition to the regeneration apparatus is reduced which in turn reduces the cost of the regeneration apparatus by eliminating a hydrogen chloride loop for chlorination of the catalyst while also reducing or eliminating the discharge of hydrogen chloride to the atmosphere and the pollution problems associated therewith.

The process of this invention further improves the operation of the regeneration process when used in conjunction with oxygen-enriched and oxygen-deficient gas streams. The operation of the metal redispersion zone is improved by passing an oxygen-enriched stream therein, which in combination with the reduction in water achieved in the aforementioned drying zone, keeps the equilibrium between hydrogen chloride and chlorine shifted toward chlorine production thereby providing a high chlorine environment with only a small addition of chloride containing compound to the metal redispersion zone. The oxygen-deficient or nitrogen-enriched gas stream obtained by the production of the oxygen-enriched stream, produces an opposite shift in the equilibrium when passed into the chloride uptake zone so that essentially all of the chlorine is available as hydrogen chloride for uptake on the catalyst. It is further possible to tailor the addition of hydrogen chloride to the chloride uptake zone such that the gas stream leaving the chloride uptake zone is relatively free of hydrogen chloride and will not pose any problems in its removal from the process.

Accordingly, in one embodiment, this invention is a process for reforming a hydrocarbon feedstock. The hydrocarbon feedstock is first passed to a reforming reaction-system where it is contacted with reconditioning catalyst particles that comprise a noble metal on an alumina carrier and a chloride compound. A reformed hydrocarbon product is recovered from the reforming zone. Deactivated catalyst particles are at least semi-continuously removed from the reforming reaction system and at least partially reconditioned catalyst particles are added to the reforming reaction system. Removal of coke from the deactivated catalyst particles in a regeneration zone reconditions the catalyst particles. In a first regeneration step, the catalyst particles are contacted with an oxygen-containing gas to remove the coke by combustion. The catalyst particles are then contacted with dry, heated gas to remove water from the catalyst particles and produce dried catalyst particles. The dried catalyst particles are contacted with a redispersion gas that contains chlorine to redisperse the noble metal and produce catalyst particles having a redispersed noble metal. After contact with the redispersion gas, the catalyst particles are contacted with a chloriding gas stream that contains hydrogen chloride and oxygen to transfer the chloride to the catalyst particles and maintain a desired concentration of chloride thereon. The partially regenerated catalyst particles are then recovered from the chloriding zone and returned to the reactor system either directly or following further reconditioning.

In a more detailed embodiment, this invention is a process for reforming a hydrocarbon feedstock in a reforming reaction system where it is contacted with reconditioning catalyst particles that comprise a platinum metal on an alumina carrier and a chloride compound. A reformed hydrocarbon product is recovered from the reforming zone. Deactivated catalyst particles are at least semi-continuously removed from the reforming reaction system and at least partially reconditioned catalyst particles are added to the reforming reaction system. Removal of coke from the deactivated catalyst particles in a regeneration zone reconditions the catalyst particles. Reconditioning is accomplished by first passing the platinum-containing catalyst to a burn zone and contacting the catalyst particles with a recycle gas having an oxygen concentration of from 0.5 to 1.5% by volume that combusts coke from the catalyst and removes the coke deposits. Catalyst particles are passed from the burn zone to a drying zone to remove water from the catalyst particles by contact with a drying gas until the particles have a water concentration of less than 1 wt. % based on catalyst weight. The drying gas has a temperature in the range of from 800°–1100° F. and an oxygen concentration of from 21 to 39 mol. %. The catalyst particles are passed from the burn zone to a redispersion zone and contacted therein with a redispersion gas that contains 0.01 to 0.2 mol. % chlorine and has an oxygen concentration of from 21 to 39 mol. %. Contact with the redispersion gas redisperses the platinum metal on the catalyst particles which are then transferred to a chloride uptake zone that increases the concentration of chloride on the catalyst particles by contacting them with a hydrogen chloride-containing gas that has an oxygen concentration of between 1 to 21 mol. % and a nitrogen concentration of between 79 to 99 mol. %. The contact of the catalyst particles with the chloriding gas is done at a temperature of less than 1000° F. and provides a chlorine concentration of from 0.4 to 1.4 wt. % on the catalyst particles. The chlorided catalyst particles are passed from the chloride uptake zone to a reduction zone wherein the catalyst particles are contacted with a hydrogen-rich gas at a temperature of from 800°–1000° F. and a pressure of from 5 to 125 psig. The reconditioned catalyst particles are recovered from the reduction zone for further catalytic use in the reaction system.

Other objects, embodiments and advantages of this invention are discussed in the following detailed description.

DETAILED DESCRIPTION OF THE INVENTION

Figure 1:
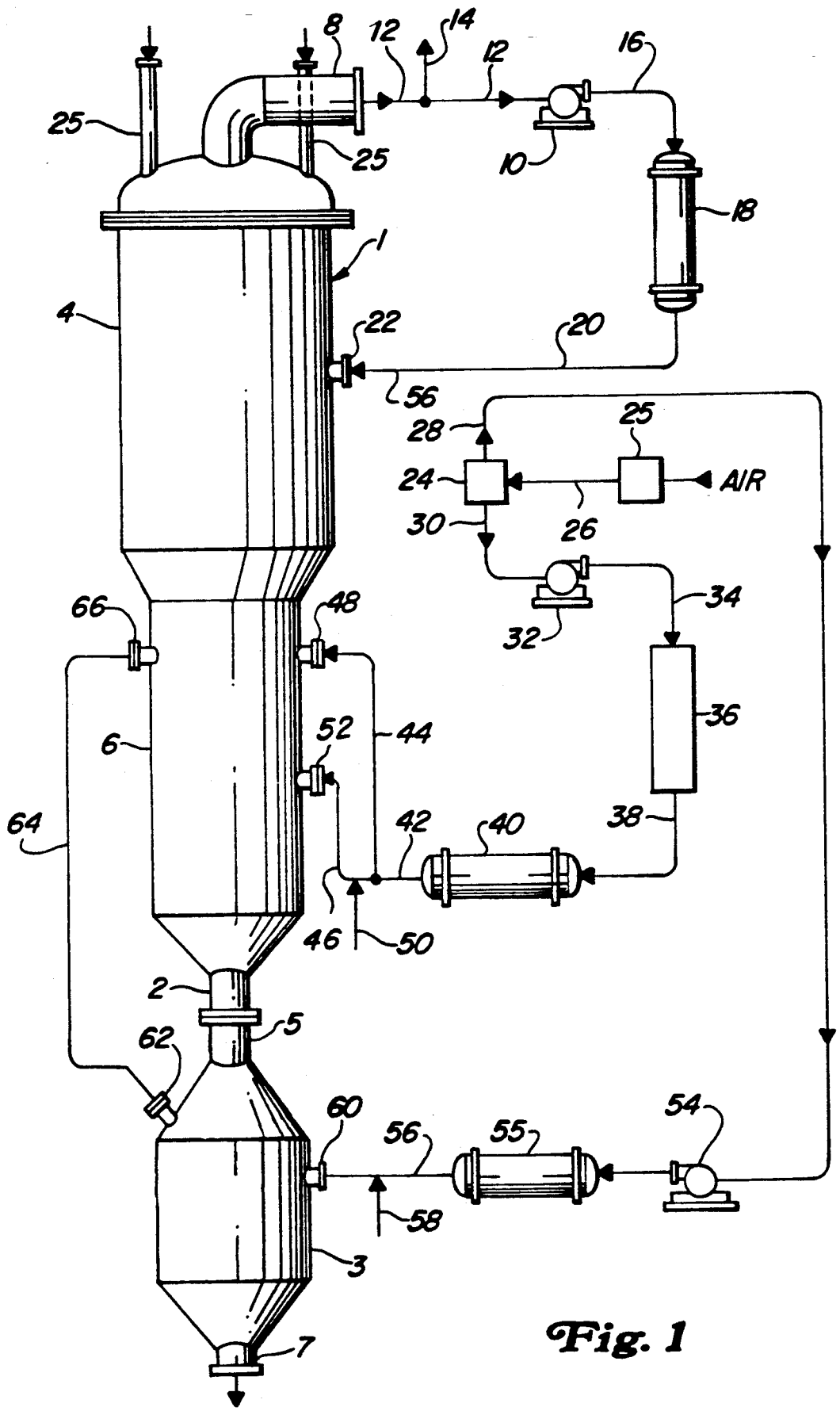
FIG. 1 is a schematic illustration of a regeneration zone arranged in accordance with this invention and some of the equipment associated therewith.

In its broadest aspects, this invention may be used to recondition any noble metal containing catalyst that loses activity by the accumulation of coke thereon and requires regeneration by the removal of coke and needs a good redispersion of the noble metal to provide adequate catalytic activity. This invention is particularly suited for catalysts that use platinum metals and maintain a chloride concentration on the catalyst particles. In such cases, the arrangement and operation of this method and apparatus will improve the redispersion of platinum on the catalyst particles, allow a better control of a chloride content on the reconditioned particles or reduce emissions and handling problems associated with hydrogen chloride-containing gases, and can reduce the overall expense of operating a regeneration zone for the reconditioning of such catalyst particles. Although all of the advantages associated with chlorided platinum aluminum catalyst may not be obtained, this invention still has broad application to the regeneration of noble metal containing catalysts.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins.

Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. It has been discovered that removal of moisture from a combustion zone for a reforming zone will produce a more than linear increase in the life of a typical reforming catalyst. The particles are usually spheroidal and have a diameter of from about 1/16th to about ⅛th inch (1.5–3.1 mm), though they may be as large as ¼th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In preferred form, the reformer will employ a moving bed reaction zone and regeneration zone. The present invention is applicable to a moving bed regeneration zone and a fixed bed regeneration zone and a fixed bed. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a batch, continuous, or semi-continuous catalyst regeneration process, catalyst is contacted with a hot oxygen-containing gas stream (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight, but 5-7% is a more typical amount. Within the combustion zone, coke is usually oxidized at temperatures ranging from 850°-1000° F., but temperatures in localized regions may reach 1100° F. or more.

Oxygen for the combustion of coke enters what is called a combustion section of the regeneration zone in what has been termed a recycle gas. The recycle gas contains a low concentration of oxygen usually on the order of 0.5 to 1.5% by volume. The arrangement of a typical combustion section may be seen in U.S. Pat. No. 3,652,231. As the coke is combusted, the small amount of hydrogen within the coke reacts with the oxygen to form water. Flue gas made up of carbon monoxide, carbon dioxide, water, unreacted oxygen, chlorine, hydrochloric acid, nitrous oxides, sulfur oxides and nitrogen is collected from the combustion section and withdrawn from the regeneration zone as flue gas. Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented off from the process to allow the addition of an oxygen-containing gas called makeup gas. The oxygen-containing gas is combined with the flue gas to replace the oxygen consumed by the coke combustion and the combined gas is recycled to the combustion section. In the past, the oxygen-containing gas was typically air. The amount of air needed in past regeneration processes to replenish the oxygen consumed during the coke combustion is relatively small, usually about 3% of the volumetric rate of the recycle gas stream.

All of the oxygen supplied to an upper region of the bed is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate.

Reiterating again, the combustion of coke also produces water. The only place for the water to escape from the combustion step is in the small amount of vented flue gas. Therefore, the water concentration in the recycle loop increases until the difference between the amount of water entering with the makeup gas stream and the amount of water leaving with the vent stream equal the amount of water produced during the combustion of coke and equilibrium is reached. The water circulating within the recycle gas loop created a constant steam concentration during the coke combustion process. The water concentration in the recycle loop could be lowered by drying the air that made up the makeup gas, installing a drier for the gas circulating in the recycle gas loop or venting a larger amount of gas from the recycle gas stream to lower the water equilibrium in the recycle gas loop.

In prior art regeneration processes it was the practice to pass the catalyst particles from the combustion section into a halogenation zone. This invention passes the catalyst particles from the combustion zone directly into a drying zone where the water that is left on the catalyst particles after the combustion process is removed. Water is evaporated from the surface and pores of the catalyst particles by contact with a heated gas stream. Any gas stream that can absorb water from the catalyst particles can be used in the drying zone. The drying gas in the past has typically been air which after heating to a temperature of between 800°-1100° F. can reduce the moisture content of the catalyst particles to acceptable levels. Drying of the air stream before it is heated will increase the adsorbability of water from the catalyst particles and decrease the size of the drying zone. It is preferable that the drying gas stream contain oxygen so that any final residual buring of coke from the inner pores of catalyst particles may be accomplished in the drying zone, and any excess oxygen that is not consumed in the drying zone can pass upwardly with the flue gas from the combustion zone to replace the oxygen that is depleted through the combustion reaction. In a preferred form of this invention, the drying gas will have an oxygen concentration that is at least roughly equal to that of air. In a preferred embodiment, all or a portion of the drying gas will be oxygen-enriched so that there will be a high oxygen concentration in the drying zone that will promote complete combustion of any residual coke left in the catalyst. As hereinafter described, it is also possible to pass an oxygen-deficient gas stream from a different regeneration step to the drying zone. When such an oxygen-deficient gas is transferred to the drying zone, its combination with the oxygen-enriched gas will provide an overall oxygen concentration in the drying zone roughly equal to that contained in air. Contact of the catalyst particles with a gas containing a high concentration of oxygen also aids in restoring full activity to the catalyst particles by raising the oxidation state of the platinum or other metals contained thereon. The drying zone should be designed to reduce the moisture content of the catalyst particles to at least 0.1 wt. % based on catalyst weight before the catalyst particles leave the drying zone. Preferably, the catalyst particles will have a water content below 0.01 wt % and more preferably between 0.005 to 0.007 weight % before passing to the catalyst to the redispersion zone. The gas entering the drying zone will generally be kept at a temperature of between 800°-1100° F.

Following drying, the catalyst is contacted with a chlorine-containing gas to redisperse the noble metals over the surface of the catalyst. This redispersion step typically takes place in a separate zone located below the drying zone. Exposure to reactants in a wet reduction zone and the exposure to high temperatures and steam in the combustion zone serves to agglomerate the metals on the surface of the catalyst. Once the coke has been removed and the catalyst particles are in various states of oxidation, contact of the catalyst at a temperature between 800°-1100° F. in a chlorine environment will re-disperse the platinum particles over the surface of the catalyst support. Temperature within the redispersion zone will usually be in a range of 950°-1000° F. A high concentration of chlorine, on the order of 0.01 to 0.2 mol. % of the gas in the redispersion zone, is highly beneficial to promoting rapid and complete redispersion of the platinum metal.

The redispersion step is carried out in the presence of chlorine and an oxygen atmosphere. An oxygen atmosphere is generally employed and desired in carrying out the redispersion step. The presence of oxygen aids in the redispersion of the metallic catalyst components on the carrier. A lower water concentration in the environment of the redispersion section also facilitates the redispersion by maintaining a high chlorine concentration in the redispersion zone. The concentration of chlorine in the redispersion section is governed by the Deacon equilibrium equation.

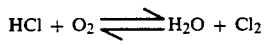

$$HCl + O_2 \rightleftharpoons H_2O + Cl_2$$

Therefore, to the extent that the catalyst entering the redispersion section has a lower water concentration, it will favor the shift to the right of the equation, thereby producing more chlorine for the redispersion step. Since oxygen aids in the redispersion of platinum, additional benefits are obtained by the method of this invention when an oxygen-enriched stream is passed into the redispersion section to increase the oxygen concentration and further promote the redispersion of the catalytic metal on the carrier. Therefore, in its preferred form, an oxygen-enriched stream will be combined with a chlorine gas and distributed in the redispersion zone. The low water content and the high oxygen concentration will prevent a loss in a chlorine concentration by preventing an equilibrium shift to the left that would produce hydrogen chloride. In the past, the environment in the halogenation zone provided an equilibrium that favored hydrogen chloride. Previously, hydrogen chloride to chlorine ratio was as high as 13 to 1. This high concentration of hydrogen chloride relative to chlorine required large quantities of chloride to be present in the halogenation zone. These large quantities of chlorides, primarily in the form of hydrogen chloride, led to the previously mentioned equipment and environmental problems. By shifting the equilibrium equation to the production of chlorine instead of hydrogen chloride, a high chlorine concentration—much higher than was obtained in the prior art—may be obtained in the redispersion zone with a much lower overall chloride concentration than was present in the halogenation zone of the prior art. This reduction in overall chloride concentration greatly reduces or eliminates the problems associated with chlorides that left the halogenation zones of the prior art.

The redispersion gas will usually exit the redispersion zone by entering the drying zone. As the chlorine containing redispersion gas leaves the drying zone with the drying gas and comes into contact with water on the catalyst that is entering the drying zone, the equilibrium reaction will again favor the production of hydrogen chloride. As a result, essentially all of the chloride that leaves the redispersion zone will eventually be converted to hydrogen chloride once it is passed through the drying zone. In a typical arrangement, the redispersion gas and drying gas will become mixed with the flue gas that is passing through the combustion zone. Therefore, once again, hydrogen chloride resulting from the presence of chlorides in a treatment zone will be present in the flue gas from the regeneration process. However, because of the much lower overall chloride concentration needed in the redispersion zone to produce a high chlorine environment, the amount of hydrogen chloride now present in the flue gas will be in concentrations that will raise few metallurgical problems with process equipment and will necessitate minor, if any, treatment in the gas vented from the flue gas. Since in previous practice the hydrogen to chlorine ratio was 13 to 1, this invention by reversing the equilibrium conditions within the redispersion zone can provide more than a 10-fold decrease in the amount of chlorides that exit the redispersion zone while providing an environment with an equivalent chlorine concentration.

After the platinum has been redispersed on the catalyst, it is passed to a chloride uptake zone. The chloride uptake zone provides a chloride compound that wil react with hydroxyl groups on the catalyst support to provide active chloride on the catalyst. Preferably, the catalyst composition will have a chloride concentration in a range of from 0.4 to 1.4 wt. % and more preferably from 0.8 to 1.2 wt. %. Although a number of different chloride compounds can be used that will react with the hydroxyl groups, the preferred chloride compound is the previously mentioned hydrogen chloride. Since the function of the chloride uptake zone is simply to transfer chloride to the catalyst, it is desirable that all of the chloride be present in a form suitable for such uptake. Therefore, in a case of hydrogen chloride, chloride uptake zone is maintained at conditions that will favor an equilibrium shift towards hydrogen chloride. Hydrogen chloride is transferred into the chloride uptake zone with an oxygen-deficient gas stream so that the Deacon equilibrium is now shifted towards hydrogen chloride and oxygen production. By reducing the oxygen concentration, essentially all the chloride present in the chloride uptake zone can be taken up by the catalyst composition. Preferably, the oxygen content in the chloriding gas will have a concentration of from 1.0 to 10 mol. %. A certain concentration of oxygen is desired in order to prevent a reduction in the oxygen state of the noble metal present on the catalyst composition. Preferably, the chloride uptake zone will have a temperature of from 400°-1000° F. Nitrogen enrichment of the gas stream to the chloride uptake zone is usually used to lower the oxygen concentration. The nitrogen-enriched gas going into the chloride zone provides a convenient medium for the transfer of low concentrations of HCl. The concentration of hydrogen chloride that enters the chloride uptake zone may be lowered substantially relative to those that were in the previous halogenation zone. In fact, the amount of hydrogen chloride entering the chloride uptake zone can be restricted in amounts such that essentially all of the chloride entering the zone is taken up by the catalyst. Therefore, the effluent gas that leaves the chloride uptake zone can be essentially free of hydrogen chloride.

Preferably, the chloride uptake zone is contained in a separate vessel from the redispersion zone. The use of a separate vessel for the chloride uptake zone segregates the gas present therein from the environment of the redispersion zone. This segregation keeps almost all of the hydrogen chloride from the chloride uptake zone from entering the redispersion zone. However, the segregation is not needed to prevent gas that has passed through the chloride uptake zone from entering the redispersion zone or the drying zone when there is essentially complete uptake of hydrogen chloride in the chloride uptake zone. In fact, the gas stream that enters the chloride uptake zone is typically dry, therefore, in one embodiment of this invention, the dry and now substantially hydrogen chloride-free gas from the chloride uptake zone may be passed into the drying zone. Since this gas is oxygen-deficient, it is preferable to pass it into the drying zone and not into the redispersion zone where a high concentration of oxygen is still desired to maximize the presence of chlorine.

Chlorided catalyst from the chloride uptake zone must be reduced to change the noble metals on the catalyst to an elemental state by reduction. Consequently, in most processes, the catalyst will be contacted with a hydrogen-rich reduction gas before being used for catalytic purposes. Reduction of the highly oxidized catalystic with a relatively pure hydrogen reduction gas will restore essentially all of the catalytic activity to platinum metals that are typically used in reforming catalyst. The hydrogen-rich reduction gas will typically have a hydrogen concentration of about 85 mol. %. The hydrogen gas will contact the catalyst at a temperature of between 800° to 1000° F. and more preferably between 900°–950° F. Although reduction of the oxidized catalyst is an essential step in most reforming operations, the step is usually performed just ahead or within the reaction zone and is not generally considered a part of the apparatus for the regeneration process.

Preferred embodiments of this invention use oxygen-enriched or nitrogen-enriched air streams for the catalyst treatment zones. A number of processes are known for enriching air streams with oxygen and nitrogen. These processes can use selective adsorbents, gas permeable membranes or a combination of both to generate such streams. One such process that uses a gas permeable membrane to enrich an oxygen stream and producing non-permeate stream with an increased nitrogen concentration is shown in U.S. Pat. No. 4,787,919. The teachings of which are herein incorporated by reference. This gas system has the added advantage of simultaneously reducing the moisture content of the non-permeate nitrogen stream. Additional diffusion membranes for the separation of gases are also shown in U.S. Pat. No. 3,830,733. The teachings of which are herein incorporated by reference. These and other commercially available processes can economically produce nitrogen-enriched gas streams having oxygen concentrations of 7% or less and oxygen-enriched gas streams having concentrations of 39 mol. %. Air separation processes are particularly beneficial since they provide both oxygen-enriched and nitrogen-enriched gas streams that can be used in different treatment steps of the regeneration zone. Nevertheless, this invention does not require the use of any particular source of oxygen-enriched or nitrogen-enriched gas streams for use in the conditioning steps.

Figure 2:
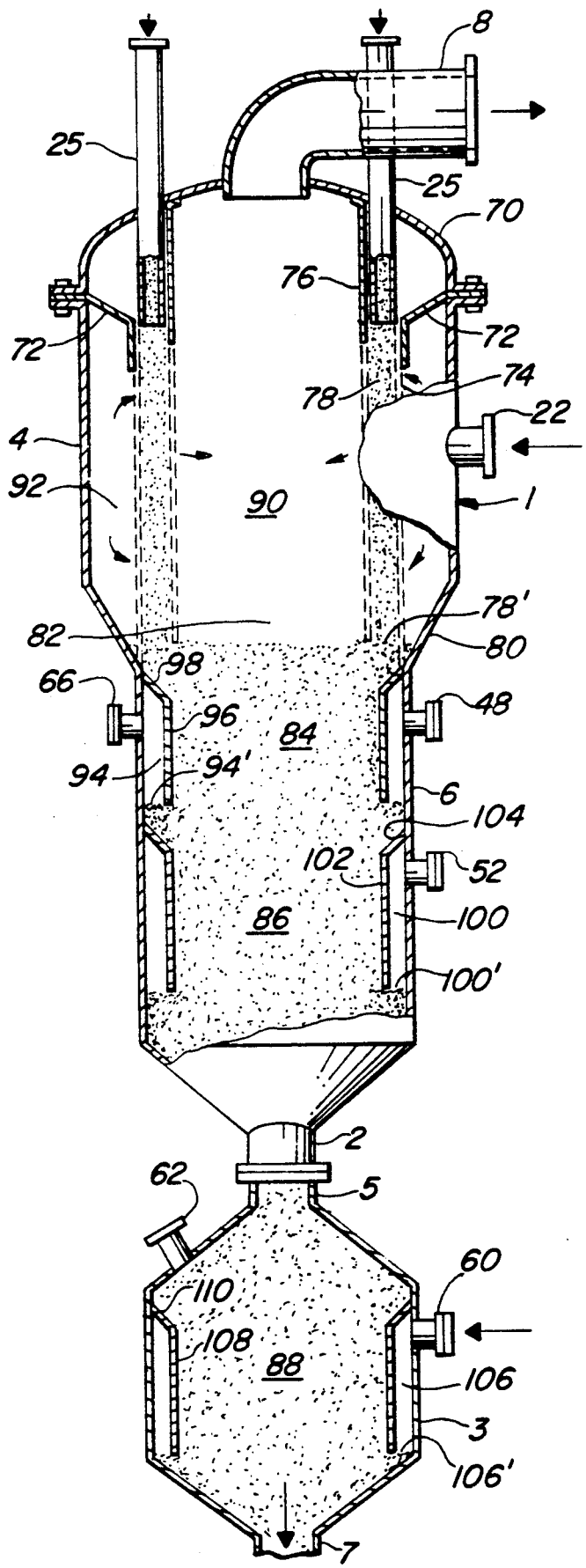
FIG. 2 is a partial cross-sectional elevation of the regeneration zone shown in FIG. 1.

The specific arrangement and operation of a regeneration process that incorporates this invention can be better understood by reference to FIGS. 1 and 2. These Figures will be used to describe an example of a particular application of this process in the reconditioning of reforming catalyst. The description of this invention in the context of a specific example and regeneration zone arrangement is not intended to limit the broad scope of the invention as presented in the claims. The drawings show only elements and equipment which are essential to a clear understanding of the invention. Application and use of additional required items is well within the purview of one skilled in the art. U.S. Pat. Nos. 3,652,231; 3,647,680 and 3,692,496, which have been previously mentioned, may be consulted for additional detailed information. Numerical data provided in this example such as stream compositions, flow rates, component concentrations, temperatures and pressures have been calculated in full or in part using engineering calculation and data from related regeneration processes.

Referring now to FIG. 1, spent catalyst particles containing 5 wt. % coke are introduced into regeneration vessel 1 by means of nozzles 25. Catalyst is removed from regenerator 1 at the lower end through nozzle 2. Regeneration vessel 1 has an upper section 4 and a lower section 6. Catalyst removed from nozzle 2 is transferred into a chloride uptake vessel 3 through a nozzle 5. A nozzle 7 removes reconditional catalyst from vessel 3 and the process.

Flue gas having an oxygen concentration of approximately 0.7 mol. % and a HCl concentration of approximately 1600 ppm leaves the upper section of the regeneration vessel through nozzle 8. Flue gas exiting through nozzle 8 is conveyed to blower 10 by pipeline 12. Approximately 3 wt. % of the flue gas leaving the regenerator through pipeline 12 is vented from the system by pipeline 14. The recycle gas from blower 10 is carried by line 16 and passes through heater 18. Heater 18 heats the recycle gas to carbon-burning temperatures during start-up and, if necessary, adds heat to the recycle stream during normal operation. Recycle gas leaving heater 18 through pipeline 20 enters the regenerator through nozzle 22. Pipelines 12, 16 and 20 together with a hereinafter described combustion section form a recycle loop.

A gas separation system 24 supplies make-up gas to the recycle loop. Air from drier 25 enters gas separation system 24 by a pipeline 26. Separation system 24 produces an oxygen-deficient gas stream, carried by pipeline 28 and an oxygen-enriched gas stream carried by a pipeline 30. The oxygen-enriched gas is added to regeneration vessel 1 and the oxygen-deficient gas stream is added to chloride uptake vessel 3 in a manner hereinafter described. The rate of addition for both the oxygen-deficient and oxygen-enriched gas streams are generally equal to the rate of the gas venting from line 14.

Oxygen-enriched air from line 30 is taken into blower 32. Blower 32 discharges oxygen-enriched air into line 34 and through a drier 36 that reduces the moisture content of the oxygen-enriched air. Dry air is passed by line 38 into a heater 40 that raises the temperature of the oxygen-enriched air to about 1000° F. Dry heated air is taken by line 42 and divided between a line 44 and a line 46. Approximately 50 vol. % of the oxygen-enriched air is taken by line 44 and delivered to a hereinafter described drying zone through nozzle 48. The remainder of the enriched air in line 46 is mixed with a chlorine stream from line 50 that gives the contents of line 46, a chlorine concentration of about 0.11 mol. %. The chlorine and dry heated air enter a hereinafter described platinum redispersion zone through a nozzle 52. Although in this is arrangement, the oxygen-enriched stream discharged from the heater is split between the drying zone and the redispersion zone, other regenerator arrangements may transfer all of the oxygen-enriched gas from line 42 directly into the redispersion zone.

The oxygen-deficient stream carried by line 28 is drawn into a blower 54 through a heater 55 and discharged into a line 56 which is admixed with hydrogen chloride from a line 58. The oxygen-deficient air stream contains, depending on the catalyst surface area, 0.05 to 0.3 wt. % hydrogen chloride based on the mass of catalyst circulated and enters the chloride uptake zone through a nozzle 60 at a temperature of about 500° F. Chlorided catalyst is withdrawn from the bottom of the chloride uptake vessel 3 through nozzle 7. Essentially all of the hydrogen chloride that enters with the oxygen-deficient gas stream is taken up by the catalyst in the chloride uptake zone 3. An oxygen-deficient gas stream containing less than 200 ppm hydrogen chloride exits chloride uptake vessel 3 through a nozzle 62 and is transferred by line 64 into a hereinafter described drying zone through a nozzle 66.

The various zones and the arrangement of the internals in the regeneration vessels can be more fully appreciated from FIG. 2. Looking first at the flow catalyst particles, nozzles 25 pass through the upper head 70 of regeneration vessel 1. The nozzles discharge catalyst particles into an annular catalyst bed 78 formed by an outer catalyst retention screen 74 and an inner catalyst particle retention screen 76. Retention screens 74 and 76, in this embodiment, are cylindrical in form and concentric with the center line of regeneration vessel 1. Retention screens 74 and 76 are perforated with holes that are large enough to allow gas to pass through the annular catalyst bed but not permit the passage of catalyst particles therethrough. Outer catalyst particle retention screen 74 extends downward from the bottom of nozzle 25 to a swedge section 80 of regeneration vessel 1. Angled supports 72 guides the top of screen 74 and keep it centered in vessel 1. Inner catalyst retention screen 76 is attached to the top head of vessel 1 and extends downward therefrom to a point slightly above the lower end of outer catalyst screen 74. The bottom 78' of the annular catalyst particle bed 78 is open to allow catalyst particles to empty from the catalyst bed into a central portion 82 of regeneration vessel 1. From about the bottom of opening 78', the catalyst particles fill the lower section 6 of the regeneration vessel 1. The upper volume of catalyst particles in the lower section 6 are located in a drying zone that is generally denoted as 84. Catalyst particles in the lower portion of vessel 6 generally denoted by the number 86 are in a redispersion zone. Catalyst particles in section 86 are statically supported by catalyst particles that extend through the end closure of lower section 6 and through the chloride uptake vessel 3. The catalyst particles are periodically transferred by withdrawing a predetermined volume of catalyst from the chloride uptake vessel 3 through nozzle 7 which in turn allows all the catalyst particles to slump downward through the previous described zones. Catalyst is withdrawn from nozzle 7 at a rate that creates a 1 hour cycle time for a particle to pass from the top of inlet nozzle 2 to the bottom of catalyst outlet nozzle 7.

As the catalyst particles travel downward through the regeneration process, they pass first through a combustion zone 90 that includes the previously described annular catalyst bed 78. Recycled gas that enters the combustion zone through nozzle 22 is distributed in an annular chamber 92 that extends around the outer catalyst particle retention screen and is defined on its sides by outer particle retention screen 74 and the vessel wall of upper vessel section 4 and its bottom by swedge section 80. An upper portion 76' of inner particle retention screen 76 is impervious to gas flow, or blanked off to prevent gas flow from chamber 92 across the top of the vessel. As the recycle gas passes through catalyst bed 78, oxygen is consumed in the combustion of coke and flue gas is collected in central section 82. Flue gas in central section 82 is transported out of the regeneration vessel head 70 by nozzle 8.

Catalyst below combustion zone 90 is contacted with a drying gas. The drying gas enters the drying zone through nozzles 48 and 66 from the previously described sources. Nozzles 66 and 48 communicate with an annular volume 94 that distributes fluidizing gas. Distribution volume 94 is formed by a baffle having a vertically extended cylindrical section 96 that is concentrically located with respect to the regeneration vessel 1. The upper portion of the baffle consists of a frusto-conical section 98 that is attached to the lower section of swedge 80 and supports the upper end of cylindrical section 96. The bottom 94' of annular distributing volume 94 is open and drying gas flows outward into the drying zone around the entire circumference of cylinder 96. The relative duration of catalyst particles within the drying zone for a given catalyst circulation rate is determined principally by the vertical length of cylindrical section 96. The catalyst particles remain in the drying zone for approximately 2 hours and leave the bottom of the drying zone having a water content of approximately 0.6 wt. %.

The structural design of redispersion zone 86 is essentially the same as that of the drying zone. Previously described chlorine containing drying gas enters, via nozzle 52, an annular volume 100 that distributes the redispersion gas. Distributing volume 100 is defined by the wall of lower vessel section 6 and a baffle consisting of another concentric cylinder 102 that is secured to the lower vessel by frusto-conical section 104. Again an open bottom 100' allows redispersion gas to be distributed about the entire circumference of the annular distributing volume 100 and about the redispersion zone 86. Catalyst duration within the redispersion zone is also governed principally by the length of cylindrical section 102. In this example, the redispersion zone has a sufficient length to provide approximately a 2 hour residence time for the particles located therein.

The final step provided by this apparatus for conditioning the catalyst occurs in the chloride uptake zone 88. The previously described oxygen-deficient gas enters the chloride uptake vessel 3 through nozzle 60 and is distributed about a chloride uptake zone 88 through an annular volume 106. Chloride gas distributing volume 106 is defined by the sidewall of the chloride uptake vessel 3 and a baffle consisting of a concentrically located cylindrical section 108 and a frusto-conical portion 110 that closes the top of volume 106 and secures cylindrical section 108 to chloride uptake vessel 3. Open end 106' of distributing volume 106 distributes chloride-containing gas about the entire circumference of cylinder 108 and about chloride uptake zone 88. The residence time for catalyst particles in a chloride uptake zone is determined by the length of chloride uptake vessel 3. The narrow diameter of nozzles 2 and 5 relative to the diameter of lower section 6 and chloride uptake vessel 3 restricts the communication of hydrogen chloride from the chloride uptake zone 88 into the redispersion zone 86. This restriction forms an effective seal that prevents the transfer of hydrogen chloride from chloride uptake zone 88 into redispersion zone 86. Chloride uptake vessel 3 is sized such that the catalyst particles have a residence time of approximately 1 hour in the chloride uptake zone. This period of time is sufficient to allow essentially all of the hydrogen chloride that enters with the chloriding gas to be taken up by the catalyst. The oxygen-deficient gas, now essentially chloride-free, is removed from chloride uptake vessel 3 by nozzle 62 and transferred to the drying zone 84 in the manner previously described. However, it is not necessary to recycle the effluent gas from the chloride uptake zone to the drying zone and other arrangements may vent the effluent gas out of the process.

Those skilled in the art will recognize that the regeneration section described by FIGS. 1 and 2 is relatively simple in comparison to those previously employed for the reconditioning reforming catalyst. The regeneration section achieves a virtually complete removal of coke from the catalyst while also obtaining a good redispersion of platinum metals and a controlled uptake of chloride on the catalyst particles. All of these conditioning steps are obtained with a very minimal discharge of chloride compound from the regeneration zone. This new arrangement only relies on one recycle loop to return flue gas to the combustion zone. The previously employed halogenation loop found in most prior art regeneration sections has been eliminated with a substantial savings in cost due to the expensive materials that were needed to withstand the high concentration of chloride compounds circulated therein. Therefore, this invention offers a simplified arrangement for a catalyst regeneration zone that provides a superior reconditioning of the catalyst with reduced emission problems and equipment cost.

What is claimed is:

1. A process for reforming a hydrocarbon feedstock said process comprising:
   (a) passing said hydrocarbon feedstock to a catalytic reforming reaction system and contacting said feedstock with reconditioned catalyst particles comprising a noble metal on an alumina carrier and a chloride compound, and recovering a hydrocarbon product;
   (b) at least semicontinuously removing deactivated catalyst particles from said reforming reaction system and adding at least partially reconditioned catalyst particles to said reforming reaction system;
   (c) passing deactivated catalyst particles from said reforming reaction system to a regeneration zone;
   (d) contacting deactivated catalyst particles having coke deposited thereon in a first section of said regeneration zone with an oxygen containing gas to remove coke by combustion, said oxygen containing gas having an oxygen concentration of from 0.5 to 1.5% volume;
   (e) contacting said catalyst particles having coke removed therefrom with a heated gas stream in a second section of said regeneration zone to remove water from said catalyst particles and produce dried catalyst particles having a moisture content of less than 1 wt. %;
   (f) contacting said dried catalyst particles in a third section of said regeneration zone with a redispersion gas comprising 0.01 to 0.2 mol. % chlorine to redisperse said noble metal and produce catalyst particles having a redispersed noble metal;
   (g) discontinuing the contacting of said catalyst particles with said redispersion gas and contacting said catalyst particles having a redispersed noble metal in a fourth section of said regeneration zone with a chloriding gas stream comprising 0.05 to 0.3 wt. % HCl based on the mass of catalyst particles in said fourth section and oxygen at a temperature of less than 1000° F. to maintain a concentration of chloride on said catalyst from 0.4 to 1.4 wt. % and produce a chlorided catalyst; and,
   (h) recovering at least partially reconditioned catalyst particles from said regeneration zone for return to said reaction zone in step (b).

2. The process of claim 1 wherein said catalyst includes a platinum metal.

3. The process of claim 1 wherein said heated gas stream is oxygen-enriched relative to air.

4. The process of claim 1 wherein said heated and said redispersion gas comprises an oxygen-enriched gas and has an oxygen concentration of between 21 and 39 mol. %.

5. The process of claim 1 wherein said chloriding gas stream comprises nitrogen in a concentration of from 79 to 99 mol. %.

6. The process of claim 1 wherein essentially all of the chloride in said chloriding gas is taken up by contact with the catalyst in said fourth section.

7. The process of claim 1 wherein said catalyst has a chloride concentration of between 0.8 and 1.2 wt. %.

8. The process of claim 1 wherein an air stream is separated to produce an oxygen-enriched stream and an oxygen-deficient stream, the oxygen-deficient stream comprises at least a portion of chloriding gas and said oxygen-enriched stream comprises at least a portion of said redispersion gas.

9. A process for reforming a hydrocarbon feedstock, said process comprising:
   (a) passing said hydrocarbon feedstock to a catalytic reforming reaction system and contacting said feedstock with reconditioned catalyst particles comprising a chlorided platinum metal on an alumina support, and recovering a hydrocarbon product;
   (b) at least semicontinuously removing deactivated catalyst particles from said reforming reaction system and adding at least partially reconditioned catalyst particles to said reforming reaction system;
   (c) passing deactivated catalyst particles from said reforming reaction system to a regeneration zone;
   (d) passing said deactivated catalyst to a burn zone in a first section of said regeneration zone and contacting said catalyst with a recycle gas to combust coke and remove coke deposits from said catalyst, said recycle gas having an oxygen concentration of from 0.5 to 1.5% by volume;
   (e) passing said catalyst from said burn zone to a drying zone in a second section of said regeneration zone to remove water from said catalyst and contacting said catalyst particles with a drying gas until said particles have a water concentration of less than 1 wt. %, said drying gas having a temperature in a range of from 800°–1100° F. and an oxygen concentration of from 21 to 39 mol. %;
   (f) passing said catalyst particles from said drying zone to a redispersion zone in a third section of said regeneration zone and contacting said particles with a redispersion gas comprising 0.01 to 0.2 mol. % chlorine and having an oxygen concentration of from 21 to 39 mol. % to redisperse platinum metal on said catalyst;
   (g) passing said catalyst from said redispersion zone to a chloride uptake zone in a fourth section of said regeneration zone to increase the chloride concentration of said catalyst and contacting said catalyst at a temperature of less than 1000° F. with a chloriding gas comprising 0.05 to 0.3 wt. % HCl based on the mass of catalyst in said redispersion zone and having a nitrogen concentration of 79 to 99 mol. % to provide a chloride concentration of from 0.8 to 1.2 wt. % on said catalyst;

(h) passing said chlorided catalyst particles from said chloride uptake zone to a reduction zone and contacting the catalyst particles with a hydrogen rich gas at a temperature of from 900°–950° F. and a pressure of from 5 to 125 psi; and, (i) recovering reconditioned catalyst particles from said reduction zone for return to said reaction zone in step (b).

10. The process of claim 9 wherein essentially all of the chloride in said chloriding gas is taken up by contact with said catalyst in said redispersion zone.

11. The process of claim 10 wherein said chloride uptake zone is segregated from said platinum redispersion zone to restrict the transfer of hydrogen chloride containing gas from said chloriding zone to said platinum redispersion zone.

12. The process of claim 11 wherein an air stream is passed through an oxygen enrichment zone to provide an oxygen-enriched gas stream and an oxygen-deficient gas stream, said oxygen-enriched gas stream is passed to said redispersion zone with said redispersion gas, and said oxygen-deficient stream is passed to said chloride uptake zone as said hydrogen chloride containing gas.

13. The process of claim 12 wherein said oxygen enrichment zone comprises a reverse osmosis membrane.

14. The process of claim 13 wherein said chloriding gas is passed from said chloride uptake zone to said drying zone.

* * * * *